F. GRIME.
MOTOR VEHICLE STEERING GEAR ATTACHMENT.
APPLICATION FILED JUNE 6, 1908.
935,601.
Patented Sept. 28, 1909.
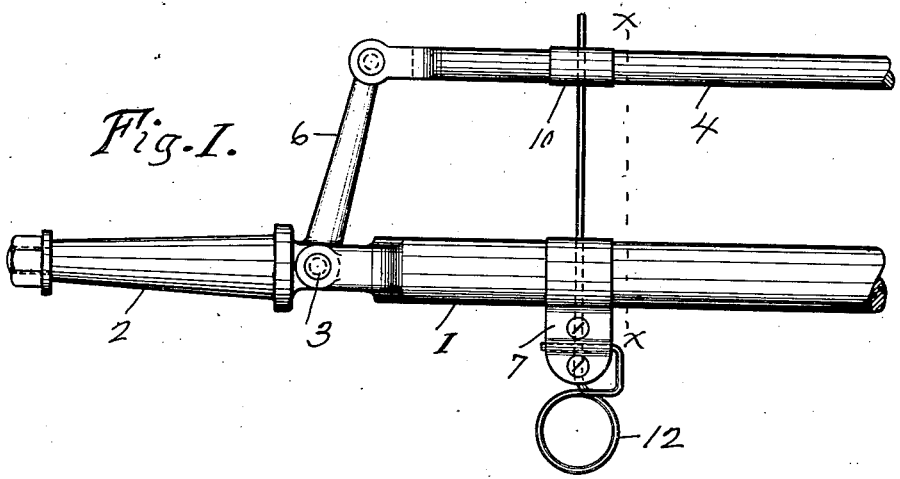
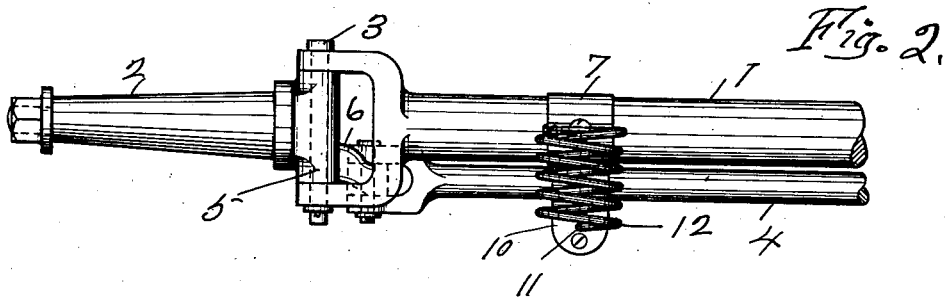
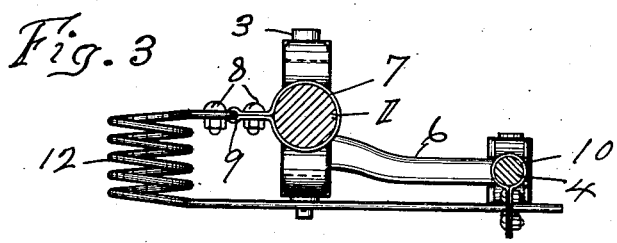
WITNESSES:
Augusta Viberg.
Auguste Spiegel
Ferdinand Grime   INVENTOR.
BY Chapin & Denny
His ATTORNEYS

UNITED STATES PATENT OFFICE.

FERDINAND GRIME, OF FORT WAYNE, INDIANA, ASSIGNOR OF ONE-HALF TO FRANK GRIME, OF FORT WAYNE, INDIANA.

MOTOR-VEHICLE STEERING-GEAR ATTACHMENT.

935,601. Specification of Letters Patent. Patented Sept. 28, 1909.

Application filed June 6, 1908. Serial No. 437,066.

*To all whom it may concern:*

Be it known that I, FERDINAND GRIME, a citizen of the United States, residing at Fort Wayne, in the county of Allen, in the State of Indiana, have invented certain new and useful Improvements in Motor-Vehicle Steering-Gear Attachments; and I do hereby declare that the following is a full, clear, and exact description of the invention, which will enable others skilled in the art to which it appertains to make and use the same, reference being had to the accompanying drawings, which form part of this specification.

My invention relates to improvements in motor vehicle steering gear attachments.

The object of my present invention is to provide a cheap, simple, efficient and reliable attachment for the steering gears of motor vehicles adapted to tend to retain the front wheels of the vehicle in proper alinement for running the vehicle in a straight course, and to automatically tend to return them to such normal position when they have been laterally deflected by a depression or other obstruction in the roadway, or by the operator in turning from a direct course, thereby aiding the unskilled or heedless operator in avoiding accidents without any interference with the turning of the forward or steering wheels in the usual manner.

My invention consists of a coiled retractile spring connected at one end with the forward axle, and at the other end with the steering rod at its outer end, in such a coöperative relation that any longitudinal movement of the steering rod in turning the front wheels from a straight course will be made against the tension of the said spring which at all times tends to maintain these wheels in a straight course without any interference with the usual turning of the forward wheels.

The novel feature of my invention resides in the construction, arrangement and coöperative relation of the retractile spring with the steering mechanism for the performance of its function without any interference with the lateral turning of the forward wheels of the vehicle.

Similar reference numerals indicate like parts throughout the several views of the drawings in which—

Figure 1 is a plan view of my invention in position upon a front axle of a motor vehicle and operatively connected to the steering rod of the same, the axle and steering rod being partly broken away. Fig. 2 is a rear side view of the same. Fig. 3 is a cross-section of the same taken on the line *x—x* of Fig. 1, and looking toward the left.

The front axle 1 is of the usual or other proper construction having a proper spindle 2, having the usual pivotal connection with the axle as shown at 3. The steering rod 4 is also of the usual or other proper construction and relative arrangement, and is pivotally connected to the journal 5 of the spindle 2 by means of the arm 6.

At a suitable point near one end of the axle 1 is rigidly fixed a clip 7 whose ends are rearwardly extended, rigidly united by proper bolts 8, or other proper means, and provided with a transverse opening at 9, Fig. 3.

In proper alinement with the clip 7 is arranged a clip 10 on the steering rod 4 near the corresponding end thereof. The ends of the clip 10 are in a pendent relation, and are rigidly united, and are provided with a lateral opening at 11, Fig. 2.

A coiled retractile spring 12 of proper strength, dimensions and tension is arranged, as shown, directly in the rear of the clip 7, and is rigidly secured thereto and is supported therefrom by fixing the upper free end thereof in the opening 9 of the clip 7, and is operatively connected with the steering rod by passing its other free end loosely through the opening 11 in the clip 10.

The operation of my invention thus described is obvious and briefly stated is as follows: Assuming the spring 12 to be in its operative relation as described, when the spindle 2 is turned in either direction out of its normal position of alinement with the axle, either by the operation of the steering mechanism, or by the contact of the front wheel with a deflecting obstruction, it is evident that such movement will be made against the tension of the spring 12, and that as soon as the wheel deflecting cause is removed this spring will exert its force in an effort to restore the spindle 2 to its normal longitudinal alinement with the axle 1.

It is thus evident that my invention automatically tends to maintain the vehicle in its normal position for a straight course forward, and not only aids the operator in restoring the vehicle to such position when it has been temporarily diverted therefrom, but also tends, to the extent of its power, to promptly make such restoration without any attention on the part of the operator.

Having thus described my invention and the manner of employing the same what I desire to secure by Letters Patent is:

A steering gear attachment for motor vehicles consisting of a coiled retractile spring in vertical arrangement adjacent to the rear face of the front axle, and having its upper end rigidly secured thereto, the lower forwardly extended end being loosely connected with the steering rod, and in right angular relation therewith, whereby any turning movement of the steering gear will be automatically resisted by the said spring.

Signed by me at Fort Wayne, Allen county, State of Indiana, this 4th day of June, 1908.

FERDINAND GRIME.

Witnesses:
AUGUSTA VIBERG,
WATTS P. DENNY.